No. 795,013. PATENTED JULY 18, 1905.
A. WEILER.
POULTRY PICKING IMPLEMENT.
APPLICATION FILED MAY 4, 1905.
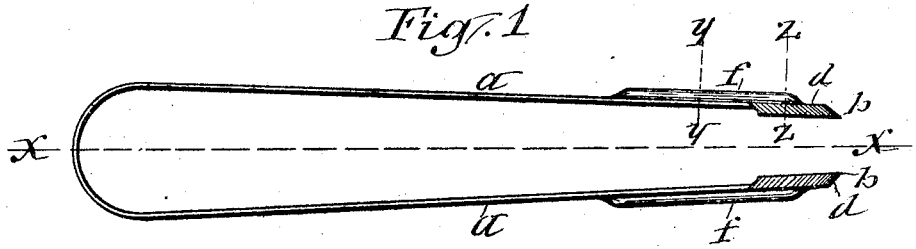
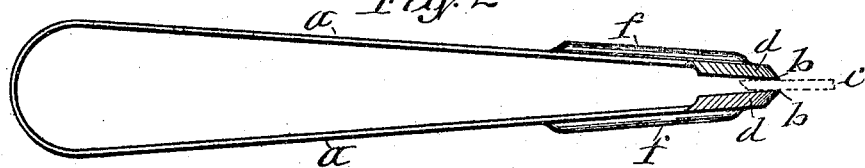
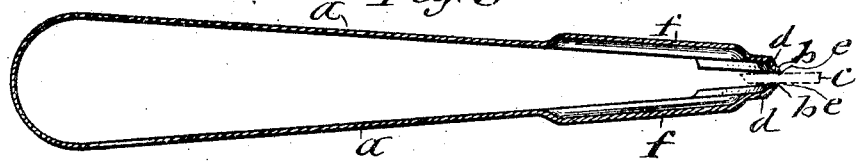
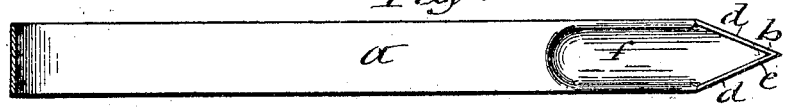
WITNESSES:
INVENTOR
Anton Weiler
By E. Laass
ATTORNEY.

No. 795,013.

Patented July 18, 1905.

UNITED STATES PATENT OFFICE.

ANTON WEILER, OF SYRACUSE, NEW YORK.

POULTRY-PICKING IMPLEMENT.

SPECIFICATION forming part of Letters Patent No. 795,013, dated July 18, 1905.

Application filed May 4, 1905. Serial No. 258,871.

*To all whom it may concern:*

Be it known that I, ANTON WEILER, a citizen of the United States, and a resident of Syracuse, in the county of Onondaga, in the State of New York, have invented new and useful Improvements in Poultry-Picking Implements, of which the following, taken in connection with the accompanying drawings, is a full, clear, and exact description.

In the operation of picking the feathers from poultry it has always been found very difficult, slow, and tedious to pluck the pin-feathers from the poultry, and in attempting to do this the flesh of the poultry is usually bruised and injured.

The object of this invention is to obviate said difficulty and injurious effects; and to that end the invention consists in the novel construction of the implement hereinafter described and as illustrated in the accompanying drawings, in which—

Figures 1 and 2 are side views of an implement embodying my invention shown in its normal condition and its operative condition. Fig. 3 is a longitudinal section of the implement in the condition shown in Fig. 2. Fig. 4 is a longitudinal section on the line X X in Fig. 1; and Figs. 5 and 6 are transverse sections, respectively, on the lines Y Y and Z Z in Fig. 1.

Similar letters of reference indicate corresponding parts.

$a$ $a$ represent flexible fingers which are united at one end and preferably formed from a strip of spring-steel band bent at the center of its length so as to dispose the ends thereof directly opposite each other and normally a short distance apart, as shown in Fig. 1. The free ends of said fingers are formed with V-shaped pincers $b$ $b$ for grasping the pin-feathers $c$, (indicated in dotted lines in Figs. 2 and 3 of the drawings.) To allow the said pincers to obtain a firm hold on the pin-feather without danger of cutting it off and leaving a portion thereof in the poultry, I form said pincers with inwardly-deflected flanges $d$ $d$, extending along the edges thereof and to the plucking-points of the pincers and flattened on the meeting edges of the flanges, as shown at $e$ $e$ in Figs. 3, 4, and 6 of the drawings. The flanges $d$ $d$ are preferably beveled on their exteriors at the ends or plucking-points of the pincers, as shown in Figs. 1, 2, and 3. Said beveled portions allow the pincers to more easily push back the skin surrounding the protruding end of the pin-feather to be plucked. The flanges $d$ $d$ also serve to stiffen the pincers.

To brace the portions of the fingers $a$ $a$ adjacent to the pincers, I form said fingers with concavo-convex longitudinal ribs $f$ $f$, extending from the pincers part way the lengths of the fingers.

What I claim as my invention is—

1. A poultry-picking implement consisting of flexible fingers provided with V-shaped pincers formed with inwardly-deflected flanges extending along the edges of the pincers and flattened on the meeting edges of the flanges for grasping and plucking pin-feathers without danger of cutting them as set forth.

2. A poultry-picking implement consisting of flexible fingers united at one end and formed at their free ends with V-shaped pincers provided with inwardly-deflected flanges on the edges of the pincers and beveled at the plucking-points and flattened on the meeting edges of the flanges and concavo-convex longitudinal ribs extending from the pincers part way the lengths of the fingers substantially as and for the purpose set forth.

ANTON WEILER.

Witnesses:
J. J. LAASS,
L. H. FULMER.